United States Patent [19]

Szpak et al.

[11] 3,726,998

[45] Apr. 10, 1973

[54] LIGHT PIPE ILLUMINATED SCAN READER

[75] Inventors: Anthony D. Szpak, Parma; Howard K. Graves, Cleveland, both of Ohio

[73] Assignee: Phonocopy, Inc., Wilmington, Del.

[22] Filed: Aug. 9, 1971

[21] Appl. No.: 169,947

[52] U.S. Cl.........178/7.6, 178/DIG. 2, 178/DIG. 27, 346/139 A

[51] Int. Cl.........H04n 1/24

[58] Field of Search........178/7.6, DIG. 2, 178/DIG. 27; 346/139 A

[56] References Cited

UNITED STATES PATENTS

| | | | |
|---|---|---|---|
| 2,967,906 | 1/1961 | Blake et al. | 178/7.6 X |
| 3,234,327 | 2/1966 | McMann, Jr. | 178/DIG. 2 |
| 3,267,555 | 8/1966 | Berger et al. | 178/DIG. 2 |
| 3,125,013 | 3/1964 | Herrick, Jr. et al. | 178/DIG. 2 |
| 3,255,357 | 6/1966 | Kapany et al. | 178/DIG. 2 |

*Primary Examiner*—Howard W. Britton
*Attorney*—Donald R. Motsko, H. Samuel Kieser and William W. Jones

[57] ABSTRACT

A facsimile scanning system having an endless belt transport for the read heads illuminates the scan line by means of an elongated linear lamp of uniform output and a flat plate light pipe thereby simplifying the illumination of the scan line and eliminating the need for a light source moving with the scanning read heads. The scan heads contain only a photoresponsive element thereby reducing the mass and with an improved pulley-belt system jitter free scanning of the heads can be achieved without edge guides for the scan heads.

11 Claims, 3 Drawing Figures

INVENTORS
ANTHONY D. SZPAK
HOWARD K. GRAVES
BY
Chittick, Pfund, Birch, Samuels & Gauthier
ATTORNEYS INVENTORS
ANTHONY D. SZPAK
HOWARD K. GRAVES
BY Chittick, Pfund, Birch, Samuels & Gauthier
ATTORNEYS

LIGHT PIPE ILLUMINATED SCAN READER

BACKGROUND OF THE INVENTION

This invention relates to facsimile scanners and more particularly to flat bed scanners which employ a scanning belt which transports a scan head along a linear scan line to obtain a photoelectric facsimile signal from the pattern of print appearing on a document which moves transversely to the scan line.

Various forms of flat bed scanners are known in the prior art particularly with reference to scanning printing stylus carriers which reproduce a facsimile copy on suitable printout paper One form of such flat bed scanner which provides read heads on the scanning belt is shown in Ser. No. 579,584, filed Sept. 15, 1966, now U.S. Pat. No. 3,502,814, assigned to the assignee of the present application. In the read heads which travel on the scanning belt there disclosed provision is made for a self-contained light source in each read head which is directed and focused to illuminate the spot which the photoelectric element in the read head is focused upon during the scan thereby providing local and temporal illumination of the appropriate area of the document being scanned.

The use of light piping in facsimile scanners and readers and for coded document reading is well known particularly where fiber optic elements are employed to effect a spatial transformation between the desired scan line and the source of illumination or photosensitive element which is coupled to the optical fibers. Such scanners are shown for example in the U.S. Pat. to Richey No. 3,270,132. Similar attempts to illuminate a scan line from a point light source using a flat plate type of light pipe device have been suggested such as shown by Chen U.S. Pat. No. 3,248,554. These prior art light directing or piping arrangements have generally been characterized by the high cost of using fiber bundles to transform the physical configuration to accomplish the desired purpose or the employment of specially shaped plates or other members which can accomplish the transformation. Such structures are relatively expensive and rely upon a point-to-point uniformity through the physical geometry of the light transmitting bodies that is essentially required to be uniform in order to accomplish a uniform illumination or signal level and this presents some difficulty where the actual light transmission paths are not uniform and are subject to variation due to angular irregularities and transmission loss due to non-uniform length of the path.

SUMMARY OF THE INVENTION

The present invention provides a simple photocell scan transport system for facsimile transmitters in which a flat bed scan transport is provided with scanning heads containing a photosensitive element which is focused on a scan line during the transport of the scan head between two spaced pulleys between which an endless stainless steel belt runs and to which the heads are attached. By eliminating the necessity for a self-contained light source in the scan head a greatly reduced mass for the scan head is realized and the requirement for electric power connections to a light source are eliminated. With a small mass for the scanning head and an improved pulley belt transport system the mechanical problems associated with jitter and the requirement for guides to maintain the run of the scan head along the true scan line are eliminated and at the same time the electrical characteristics of the photosensitive element are stablized by virture of a uniform and highly directed intense illumination of the scan line provided by a unique light piping system. For this purpose an elongated lamp generally parallel to and displaced from the scan line is provided with an opaque coating except for a slot generally corresponding in size and shape to the scan line. This transparent slot in the envelope of the lamp is coupled to a simple and economical flat plate light pipe which extends from the transparent slot in the lamp to a position where the opposite edge of the plate is directly adjacent and directed toward the scan line. This highly efficient and simply effected illumination system is rendered more reliable and the life of the lamp is extended by the addition of a heat sink to the surface of the lamp envelope opposite the transparent slot. The sink provides a condensation zone for mercury vapors within the lamp thereby avoiding their deposition in the region of the slot to prevent such deposition from fogging the transmissive character of the transparent slot.

It is, accordingly, the principal object of the present invention to provide an improved facsimile photoresponsive scan transport with a uniform scan line illumination system thereby providing for improved mechanical characteristics of a flat bed transport scan system and at the same time enhancing the electrical operation of the photoresponsive scan system.

DESCRIPTION OF THE PREFERRED EMBODIMENT

Figure 1:
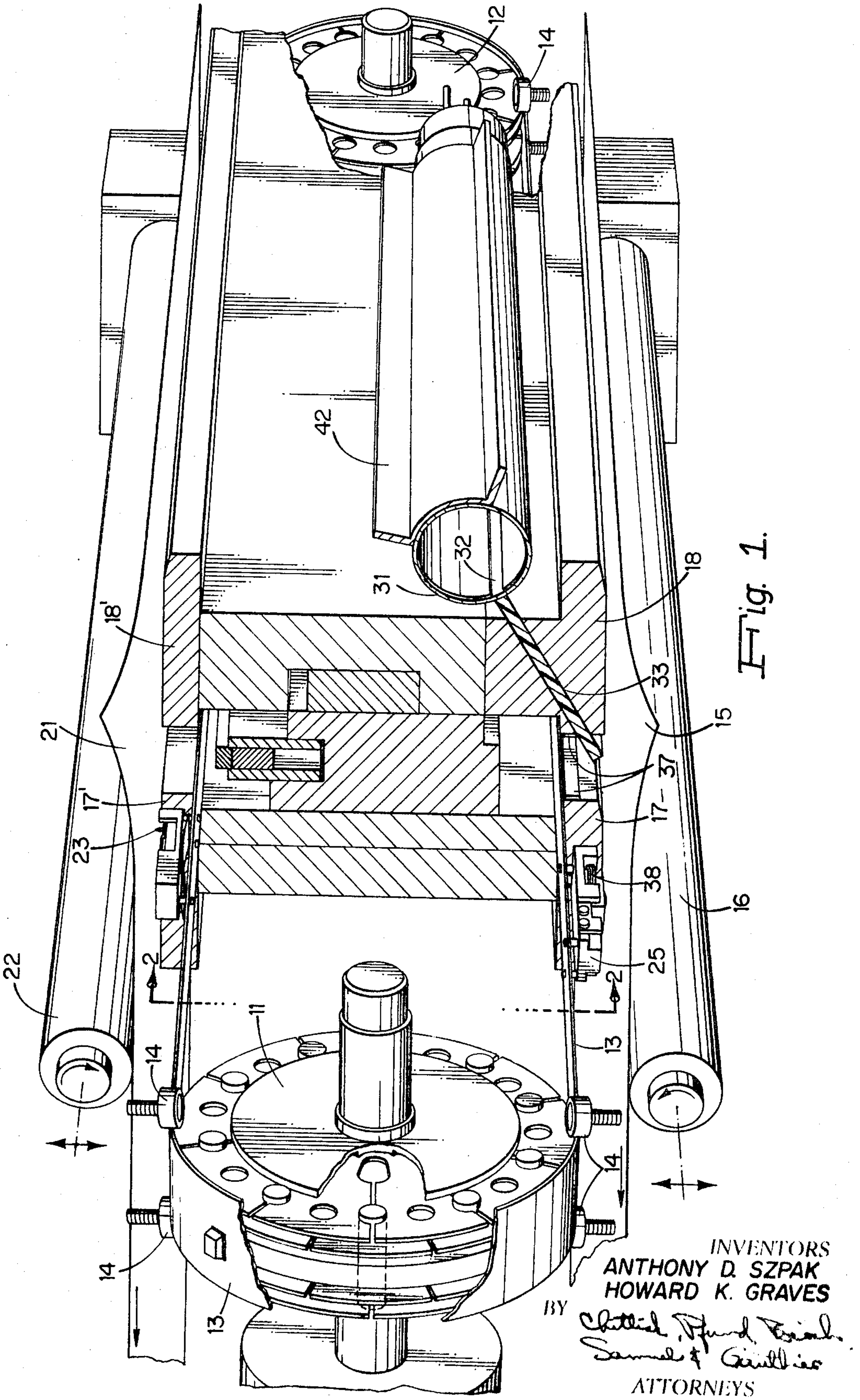
FIG. 1 is a fragmentary perspective view of a tape transport and illumination system in accordance with the invention, only portions of the structure necessary for an understanding of the invention being shown.

Referring now to FIG. 1 a pulley belt transport of the type disclosed in the application of Graves, Ser. No. 126,535, filed Mar. 22, 1971, is shown to comprise a drive pulley 11 and an idler pulley 12 with a stainless steel belt 13 tensioned therebetween. This form of transport is found to be highly reliable and stable with the steel belt 13 being constrained by rolling and preferably non-contacting guides 14. The construction and operation of this tape transport is fully set forth in the Graves application, reference to which is made for further details thereof.

The belt transport is embodied in a facsimile scanner-printer assembly of the type disclosed in the application to Goble Ser. No. 58,053, filed July 24, 1970, wherein both the upper and lower runs of the stainless steel belt 13 are utilized, one for photoelectric scanning of a document for transmission, and the other for printout scanning of an appropriate printout sheet to reproduce a facsimile copy of a document transmitted from a remote similar equipment. For this purpose a document 15 to be transmitted is advanced by a sheet transport 16 rolling in contact with the bottom surfaces of spaced flat bed members 17 and 18 to move the document 15 transversely pass the scan line which is defined as in the space between the edges of the members 17 and 18. Similarly, a printout sheet 21 is advanced by transport system 22 past the top surfaces of flat bed members 17' and 18' with the printout sheet 21 supported by the transport system 22 for contact by a printout stylus 23 carried by print scan head 24 attached to the belt 13. Three equidistantly spaced print scan heads 24 are attached to the belt 13 and midway between each pair of adjacent scan heads 24 is affixed a read head 25 also attached to the belt 13. Three such read heads 25 are equidistantly spaced on the belt 13 at the midpoints between the print scan heads 24 all in accordance with the teaching of the aforementioned Goble patent application.

In contrast to the transport disclosed in the aforementioned Goble application, the present invention provides scanning traverses for the scan heads without edge guiding contact with the slot or groove through which the heads move during scanning. This scan motion is achieved with substantially no mechanical jitter due to the low mass of the scan heads and the stability of the pulley-belt system.

In the prior art a substantial mass has been required in scanning read heads which employ a self-contained source of illumination. As described hereinafter, in the present invention illumination of the scan line is provided from an external elongated lamp and light pipe system with the result that the read head can be reduced markedly in size. Using a miniature optical system and a semiconductor photodetector, the read heads are sufficiently small and of low enough mass to minimize the dynamic unbalance occasioned by the presence of the heads on the belt. Similar considerations apply to the writing scan head which is provided with a print bar movable to erect the writing stylus into printing position.

The pulley-belt system comprises pulleys 11 and 12 which support the tensioned stainless steel belt 13 on the periphery of a plurality of slotted discs. The top and bottom belt runs which extend between the pulleys 11 and 12 pass through slots in the flat bed members 17, 18 and 17', 18' without guiding contact therewith (except electrical contact) and the stability of the belt alone is adequate to assure that mechanical jitter is below detectable limits.

For illuminating the scan line between the spaced flat bed members 17 and 18 an elongated mercury vapor lamp 31 is mounted generally parallel to the scan line and spaced therefrom. The lamp envelope is opaque except for transparent slot 32 which is generally dimensioned to correspond to the scan line area on which the photoresponsive element in the scan head 25 is focused. The slot 32 is optically coupled to one edge of a flat glass plate 33 which extends downwardly toward and terminates just short of the scan line area.

Figure 2:
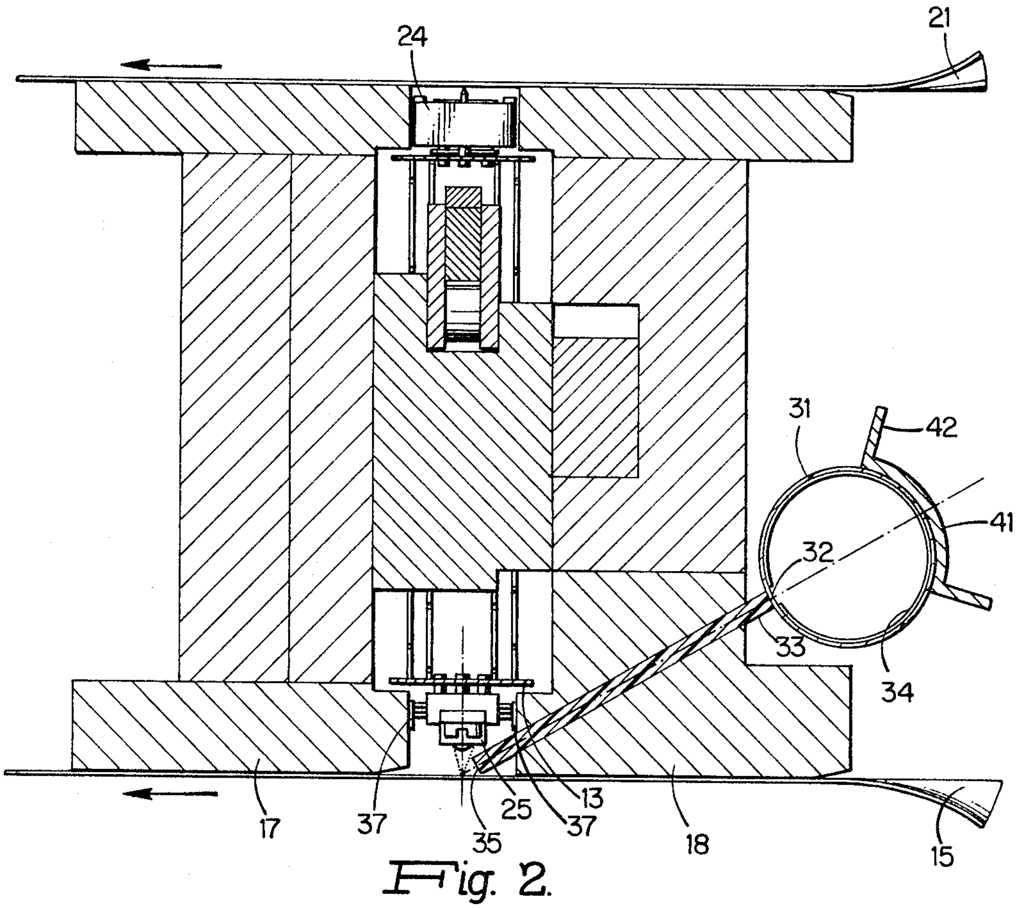
FIG. 2 is a partial sectional view taken along the line 2—2 of FIG. 1 showing the arrangement of the elements of the invention.

Referring now to FIG. 2, the general arrangement of the light pipe illumination system relative to the scan line is shown. The lamp 31 has transparent slot 32 provided by an internal opaque coating 34 which is removed in the vicinity of the transparent slot 32. As shown the light pipe plate 33 is closely coupled to the surface of the envelope of lamp 31 to receive light emanating from the slot 32 and conducted to the vicinity of the scan line where it emanates from edge 35 in concentrated form to illuminate the surface and character indicia on the document 15.

To prevent mercury vapor condensation on the inner surface of the transparent slot 32, a metallic sheath 41 formed to fit a portion of the surface of the lamp 31 and having heat radiating fins 42 acts as a heat sink. By cooling this portion of the envelope of lamp 31, the tendency for fogging of the transparent slot 32 due to condensation is minimized.

As shown in FIG. 2, the inner edges of the flat bed members 17 and 18 have supported thereon but electrically insulated therefrom a pair of conductive rails 37 which make electrical connection to the photoresponsive element in the head 25 as it travels along the scan line.

Figure 3:
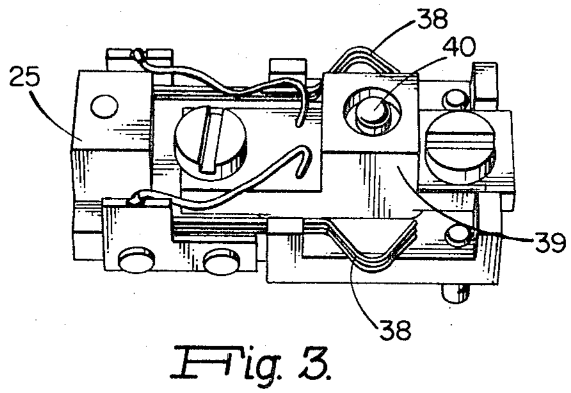
FIG. 3 is a perspective view of a photoresponsive read read.

As shown in FIG. 3, scan head 25 has a pair of springlike outboard conductive members 38 adapted for rubbing contact with the rails 37. The conductors 38 are connected to a photoresponsive member which is within the housing 39. The housing 39 contains a suitable aperture and lens 40 for focusing the scan line on the photoresponsive element. The exact position of the lens aperture 40 relative to the body of the scan head 25 is minutely adjustable to achieve precision tracking for the three scan heads 25 which are attached to the belt 13.

While features of a specific embodiment of the invention have been disclosed herein it will be appreciated that various modifications and changes are possible without departing from the spirit and scope of the invention as defined in the appended claims.

We claim:

1. In a facsimile transceiver having a scan station defining a scan line including means for continuously reading indicia on a document as the document traverses the scan line, the improvement comprising means for illuminating the line with uniform intensity throughout the length of said scan line including a lamp having a tubular body disposed remotely from said scan line, said lamp being masked throughout substantially all of its tubular body to define an elongated transparent window generally conforming dimensionally to said scan line, a light pipe having a first edge disposed in registry with said window and co-extensive therewith and a second edge terminating at said line, said light pipe being a light conduit from said remote light source effective to illuminate said scan line.

2. Apparatus according to claim 1 in which the tubular body of the lamp carries an elongated cooling fin displaced from said window to preclude fogging resulting from internal deposits of condensate at the window.

3. A scanner for facsimile or the like comprising:

read head means providing a scan aperture for a photoresponsive element contained therein;

means for traversing said read head means repeatedly along an adjacent scan line;

an elongated lamp spaced from and substantially parallel to said scan line; and a flat light transmitting plate having done edge in light receiving relation to said lamp and the opposite edge adjacent said scan line for uniformly illuminating said scan line with light transmitted through said plate.

4. Apparatus according to claim 3 in which said means for traversing said read heads comprises a metal belt tensioned on two spaced pulleys having as belt supporting surfaces the periphery of a plurality of slotted resilient discs.

5. Apparatus according to claim 3 in which said lamp is a tubular lamp longer than said scan line and is masked except for an elongated transparent window generally conforming dimensionally to said scan line, said one edge of said plate being in substantial registry with said window.

6. Apparatus according to claim 5 and including an elongated cooling member in contact with said lamp at a position displaced from said window.

7. Apparatus according to claim 5 in which said plate is rectangular to provide equidistant minimum path length through said plate from said point on said scan line to a corresponding point on said window.

8. A guidless belt scanner for facsimile comprising:

a document guide having a slot therein defining a scan line and means for advancing a record sheet transverse to said scan line;

a pair of spaced pulleys and an endless metal belt tensioned therebetween, the belt run between said pulleys traversing said scan line, said pulleys having as belt supporting surfaces the periphery of a plurality of slotted resilient discs; and spaced scan heads mounted on said belt to move along said scan line substantially free of edge guide contact and operable to scan said record sheet during travel along said scan line.

9. Apparatus according to claim 8 in which said scan heads comprise photoresponsive means for sensing indicia on a document being scanned and including sliding contact means for connecting to said photoresponsive means during scan of said document;

an elongated lamp spaced from and substantially parallel to said scan line; and a flat light transmitting plate having one edge in light receiving relation to said lamp and the opposite edge adjacent said scan line for uniformly illuminating said scan line with light transmitted through said plate.

10. Apparatus according to claim 8 and including spaced pairs of guide rollers positioned to retain said belt by edge contact with said belt at the points of tangency of said belt with said pulleys.

11. Apparatus according to claim 10 in which the spacing between said pairs of guide rollers is slightly greater than the width of said belt.

* * * * *